Dec. 8, 1964　　　V. F. ZAHODIAKIN　　　3,160,187
QUICK LOCKING FASTENER WITH SINGLE MOVABLE JAW
Filed Dec. 4, 1961
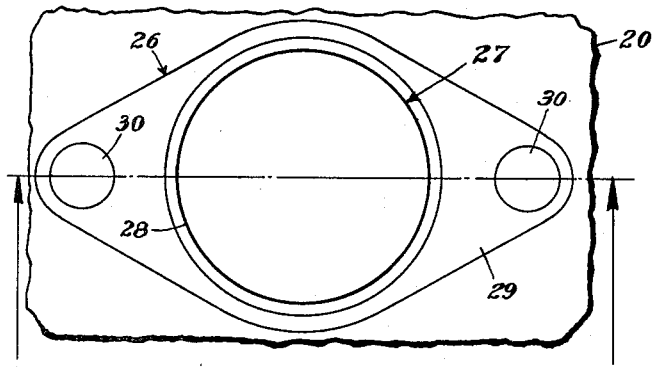
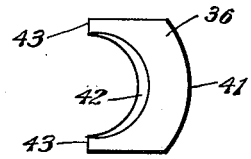
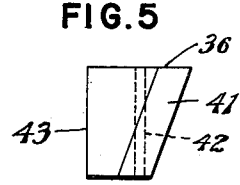
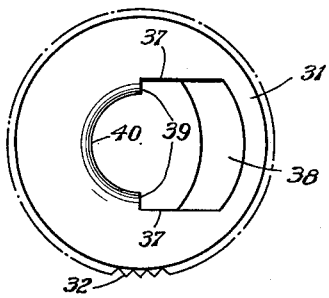
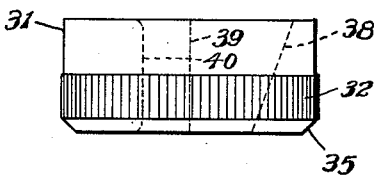
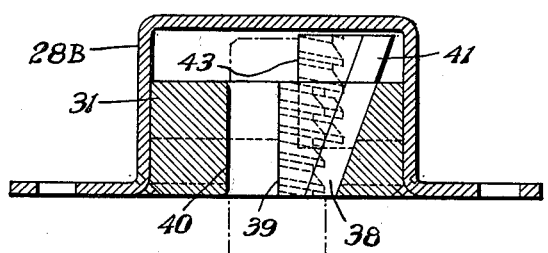
INVENTOR.
VICTOR F. ZAHODIAKIN
BY Howard P. King
ATTORNEY.

United States Patent Office 3,160,187
Patented Dec. 8, 1964

3,160,187
QUICK LOCKING FASTENER WITH SINGLE MOVABLE JAW
Victor F. Zahodiakin, P.O. Box 689, Summit, N.J.
Filed Dec. 4, 1961, Ser. No. 156,660
2 Claims. (Cl. 151—19)

This invention relates to fastening devices such as adapted for use in fastening together superposed panels or other members or assemblies. Quickly operable devices of this general character have extensive uses in industry, as for use with aircraft as well as a variety of other applications, for securing in place various members, such as plates, brackets, doors and panels, among numerous other parts and things. The invention has particular reference to fastening devices of the so-called push-rotary type, that is, of a type adapted to be secured in place by pressing on the head of the stud to slide it inwardly, and/or by relative rotation of the stud in its socket.

In its general aspect, the invention contemplates an improved and simplified fastening device of quick-locking push-rotary type as above defined which will have adequate strength for ordinary commercial uses and capable of ready and economical manufacture.

As a corollary of the above object, the invention provides a construction having a minimum of moving parts.

More specifically, the invention achieves the ultimate of the foregoing objects by requiring only one movable part in the receptacle.

Further attainment of desirable construction is to be found in fully overcoming prior art necessity of use of a plurality of jaws and the difficulty encountered therewith of synchronizing the threads thereof in proper convolutions of the stud threads.

Another object of the invention is to assure effective locking of a stud in the receptacle with or without inclusion of a spring, and unimpaired locking if the spring breaks.

In one form of the invention provision is made to obtain prevailing torque in a fastener having only one movable jaw.

In another form of the invention for use under conditions not requiring prevailing torque, a construction is accomplished enabling a very squatty receptacle to be employed.

A further object of the invention is to provide for guiding the stud in axial parallelism to the axis of the single jaw thread half convolutions.

A detail object of the invention is maintain the parts assembled and the jaw in position permitting introduction of the stud.

It is also contemplated by the invention to enable studs of assorted lengths to be each capable of use in the socket or receptacle.

Yet again, an object of the invention is to provide a construction compatible to manufacture from inexpensive materials with minimum of tooling and operations in forming and finishing the parts and in assembly.

Other objects, advantages and novel features of construction will become apparent to persons skilled in the art to which the invention appertains as the description proceeds, both by direct recitation thereof and by implication from the context.

Referring to the accompanying drawing, in which like numerals of reference indicate similar parts throughout the several views;

FIGURE 1 is a plan of the fastening device of the present invention showing the same in position on members being clamped;

FIGURE 2 is a vertical section on line 2—2 of FIG. 1;

FIGURE 3 is a sectional view corresponding to the section of FIG. 2 but showing a modified construction of fastening device;

FIGURE 4 is a plan of the single jaw as used in all of the fastening devices herein illustrated;

FIGURE 5 is an elevation of said jaw;

FIGURE 6 is a plan of the socket or jaw-receiving member comprising one element of the receptacle of the fastening device of the present invention;

FIGURE 7 is an elevation of said member; and

FIGURE 8 is another vertical section corresponding to the section of FIG. 2 and showing a further modified construction.

In the specific embodiment of the invention illustrated in said drawing, and giving attention more especially to the showing thereof in FIGURES 1 and 2 and incidental allusion to FIGURES 4 to 7, the reference numerals 20, 21 designate two members, such as panels, adapted to be juxtaposed and clamped together by the fastening device of the present invention. These members are representative of any number and thickness of bodies to be clamped together, and for distinguishing purposes member 20 will be arbitrarily designated as the inner member and the other will likewise be arbitrarily designated the outer member 21. Said members have holes 22, 23 therein adapted to register axially, both of said holes being shown to appropriately receive, in the ultimate assembly, a stud 24 insertable through both of said holes, the head 25 being shown tapered and seating in a corresponding taper of hole 23.

In general, the fastening device comprises said stud 24 and a receptacle 26 with means in said receptacle for interengaging with the stud when inserted therein. The receptacle shown in FIGS. 1 and 2 is of two-piece construction, of which one piece is here represented as a hat-shaped casing 27 of sheet material such as metal, hard plastic, hard rubber, or the like, providing a hollow downwardly open crown 28 and a laterally directed brim or flange 29 integrally formed with said crown at the lower open end thereof. In the selected embodiment here illustrated, is ultimately, in use of the fastening device, permanently or otherwise secured to the aforesaid inner member 20 by rivets or other means 30 passing through said brim or flange and member 20. In effecting such mounting of the casing, the casing crown is placed coaxial with the aforesaid hole 22 in member 20 so that when the stud is introduced through said hole and in clamping position, it will be coaxial with said crown.

The second piece of the two-piece construction of receptacle comprises a socket member 31 having an outer periphery of the same contour as the casing crown 28 and knurled as at 32 therearound or otherwise formed to have a tight fit permanently and non-rotatably securing said socket member in said casing. The bottom face of said socket member is flat and lies in the same plane as the bottom of said casing brim 29. In an axial direction, said socket member 31 has less height than the casing crown so that there will be operating space 33 between the top of said socket member and the top of said crown. After the socket member is properly located in the casing, it may be, as a factory operation, staked at peripheral intervals by diagonally center-punching the bottom of the crown into the adjacent edge of said socket member, as at 34. In this connection, attention may be called to a beneficial refinement of manufacture and assembly involving the fact that in the fabrication of the casing the juncture of brim and crown, rather than being a sharp corner, is a rounded edge of small radius. The bottom peripheral corner of the socket member has a chamfer 35, and consequently no matter what rotative relation the socket member may have with respect to the casing when those two parts are pressed together, there will be an open area at any peripheral point at which the staking is performed to accommodate the protrusion of the staking without disturbing the flat condition of the bottom face of either the brim or the socket member. Thus when the assembly is applied to a surface in ultimate use of the fastening device it will sit firmly without wobble. In this mode of assembly, the bottoms of the brim and of the socket member lie in a common plane and the socket member is retained permanently assembled non-rotatably in the casing.

The socket member 31 is longitudinally hollow with the hollow extending entirely through said member from top to bottom and shaped to receive a single movable jaw 36 and retain the same from escape, and to receive said stud 24 which is subject to insertion and withdrawal as required in use. Giving attention for the moment to FIG. 6, it will be observed that the part of the hollow for receiving said jaw exists almost entirely at one side of the socket member axis between two parallel side walls 37, 37 which are perpendicular to a common offset plane close to and parallel to said axis and perpendicular to the top and bottom faces of said member. The back face 38 of the jaw-receiving portion of the hollow slopes from top to bottom of the socket member inwardly toward said axis. As here shown, that sloping back face is a segment of a cylinder the axis whereof makes an acute angle with the axis of the socket member. Said parallel side walls extend from the said sloping back face 38 slightly past a diametric plane perpendicular thereto and terminate at the aforesaid offset plane. A shoulder 39 extending longitudinally of the socket member and its hollow is provided at the termination of each side wall, both of said shoulders being located in said offset plane. These shoulders 39 face toward the sloping back face 38. The distance between said side walls 37, 37 is greater than the length of the major diameter of the stud threads and said shoulders inwardly toward each other with a spacing of their inner edges one from the other substantially equal in extent to the length of the major diameter of the stud threads.

Also opposite said sloping back face 38 is a substantially semi-cylindrical wall 40 forming a passageway the axis whereof is coincident with the socket member axis. Said wall 40 of course is slightly less than actually semi-cylindrical to the extent of the spacing of the offset plane and shoulders from the diametric plane above mentioned. That offset is a few thousandths of an inch, for instance five thousandths, more or less. The side edges of this semi-cylindrical wall 40 are coincident with the aforesaid inner edges of said shoulders 39 in said offset plane. Furthermore said semi-cylindrical wall is smooth and provided with a rounded chamfer at its top and bottom ends, and has a radius substantially the same as the major diameter of the stud threads. In use of the fastening device, the peaks of the stud threads may be slid along the smooth semi-cylindrical wall 40 as occasion may require, and in any position of insertion of the stud the semi-cylindrical wall forms a seat against which the stud threads may be pressed and thereby retain the stud coaxial to said semi-cylindrical wall and to the socket member. The semi-cylindrical wall 40, therefore functions as a slideway and as means to counteract lateral pressure applied to the stud, but except for whatever frictional resistance that may be developed said semi-cylindrical wall affords no support for the stud in an axial or longitudinal direction.

As indicated above, the fastening device includes only a single jaw 36 therein. That jaw has a segmental cylindrical inclined back face 41 which, in assembled relation in the device, provides full surface contact with the inclined segmental cylindrical surface 38 of the socket member 31. At what may be termed the front of said jaw, namely the inwardly facing portion thereof, provides a longitudinal concavity having half convolutions of screw threads 42 for mating with the screw threads of the stud. Said half convolutions are crescent shape with radii of both arcs of the crescent at least as great as the major diameter radius of the stud threads. The crescent ends of the half threads terminate at front edges 43 situated in a common plane which is slightly closer to the maximum depth of the thread convolution than the axis of the thread half convolutions. The offset of this plane from said axis is in the order of a few thousandths, say five thousandths of an inch, more or less, and for distinguishing purposes the said plane of said front edges may be referred to as the chordal plane of the jaw. In the assembled device, without the stud being present, said front edges 43 of the jaw make full surface flatwise engagement with the shoulders 39 of the socket member, and since the offset shoulder plane was indicated as a few thousandths of an inch, for instance five, back of the socket axis, and the jaw front faces are a few thousandths of an inch, for instance five, back of the half convolution thread axis of the jaw, said convolutions under those conditions, will approach the semi-cylindrical smooth wall 40 of the socket member approximately ten thousandths of an inch closer than when the stud is present. This affords opportunity for the jaw to exert prevailing torque on the stud.

A coil spring 44 is located at the top of socket member 31 in engagement with the top end of a jaw. This spring is illustrated in FIG. 2 as of a conical type so as to reduce its operating space to a minimum. The smaller end of the spring bears against the inside of the top wall of the casing crown, holding the spring under compression and thereby tending to slide the jaw downwardly inward, which will produce the aforementiond prevailing torque when the stud is present. Preferably the length of the jaw corresponds to the height of the socket member and other dimensions arranged to obtain, in the absence of the stud, contact of front edges 43 of the jaw with the opposing shoulders 39 of the socket member when the bottom face of the jaw is flush with the bottom face of the socket member, and under that circumstance, the top of the jaw will then be flush with the top of the socket member. It may further be noted that the relationship of shoulders 29 and sloping wall 40 of the socket member with respect to the front faces or edges 43 of the jaws and inclined back faces thereof, that the jaws are prevented from escape downwardly and that the spring and casing prevent escape upwardly.

While it has been stated above that a threaded stud is provided and that the single jaw has crescent-shaped half convolutions of threads mating with the threads of the stud, the invention also contemplates a construction by which the stud may be slid inwardly of the jaw across the half convolutions of the threads thereof to attain approximate inward position of the stud in use without having to rotate the stud, and when it reaches that position it may then be rotated and pulled tight by screw operation. With this purpose in mind, I employ a stud having buttress threads, that is, threads having sloping insertion facets and substantially planar transverse facets for retention purposes. The crescent thread half convolutions are similarly formed as buttress threads. Thereby the jaw is constructed and arranged to function with a ratchet engagement for initial range of insertion of the stud and yet have screw-thread final engagement with the stud.

Except for the difference in the top end of the casing crown and shape of spring employed, the construction of FIG. 3 is the same as that of FIGS. 1, 2 and 4 to 7 so for the most part, the same description and reference numerals are applicable thereto. It will be observed that an axial opening 45 is provided in the top of crown 28a in FIG. 3 of adequate diameter to permit the stud shank to pass therethrough. A curled-down rim 46 is provided circumferentially of said opening so as to form an annular channel 47 therearound inside the casing within which a cylindrical coil spring 44a will seat and be compressed downwardly against the top of jaw 36 with the rim keeping the spring coaxial to the casing. In absence of the stud, the spring engages the upper face of the jaw next to the extreme outer edge thereof so that as the jaw is slid upwardly the spring will slip thereon and still bear upon said upper face of the jaw.

Where the provision of prevailing torque is not required, the spring may be omitted as indicated in FIG. 8 wherein the same reference numerals as used in FIGS. 1, 2, and 4 to 7 and corresponding description again applies. The difference from those views resides in omission of the spring and advantageous lowering of the height of casing crown 28b. This construction is advantageous both from an economy standpoint and for obtaining a more squatty device for installations where needed or desired. This construction is therefore one which includes only a single movable part, namely, the jaw, and no spring, lowering cost of parts, labor and assembly. Such a device has many commercial applications too numerous to mention.

The springs shown in FIGS. 2 and 3 are not considered moving parts as they remain in position and merely compress, so those constructions likewise come under the category of fastening devices having only one moving part, namely, the jaw. It may also be emphasized that all forms of the invention contemplate provision of a hollow socket member which has different surface configurations for the hollow on two opposite sides of the socket member axis, one surface being substantially semi-cylindrical and coaxial with the socket member axis, and the other surface being inclined to said axes, and while the inclined surface has been shown segmentally cylindrical it may have some other configuration and in any event the jaw will have a like configuration thereto. The peaks of the stud threads may both rotate and slide with respect to the longitudinal semi-cylindrical surface, and those peaks may be flattened as shown in the drawing at 48 to increase their bearing surface against said semi-cylindrical surface of the hollow of the socket member. It also may be added that with a view to regulate both the cost of manufacture and provision of required strength of fastening device for the particular use for which intended, materials used may be chosen from many different ones on the market, such as steel, aluminum, hard plastic, and the like.

When the front edges 43 of the jaw 36, in absence of the stud 24, are against shoulders 39 of the socket member 31, the stud-receiving opening has a somewhat elliptical shape and yet sufficiently open to permit the stud to be forced therein, moving the jaw both longitudinally and radially. Upon entry of the stud into that opening and reception of the stud by one or more of the partial thread convolution of the jaw, prevailing torque is immediately present. It should be particularly noted that since there is only one jaw and the opposing surface is smooth, there is no requirement for synchronization of threads of a plurality of jaws to properly mesh with the right thread of the stud. In fact, in the present invention, the stud may be inserted with a considerable initial tilt, aided by the chamfer at the bottom edge of the semi-cylindrical smooth wall 40. A stud in tilted position initially will be engaged by the lowermost half convolution of jaw thread without having to register the stud thread with any other threaded jaw. As the jaw is pushed by the stud, it moves both radially and longitudinally and admits the stud further into the socket, and the tilt of the stud is reduced and shortly entirely eliminated as the stud straightens up in sliding contact with the semi-cylindrical surface 40 and ratcheting contact with the partial convolutions of the jaw threads. The fact that the jaw is both radially and longitudinally movable is conducive to readily effecting the ratchet action. When the stud is inserted in the socket member, jaw 36 carries the axial load and by virtue of the inclined surfaces of the jaw and socket member a radial force is applied as a result of the axial load. That force is directed toward the smooth semi-cylindrical surface 40 of the socket member, said surface being subject to the radial force only without taking part in supporting the axial load. It should furthermore be noted that beginning with the lowermost partial thread convolution of the jaw and for all others thereabove, the smooth semi-cylindrical surface is in direct opposition thereto at the same level as said partial convolution so the jaw will not tend to either slope the stud or shear the same.

I claim:

1. A fastening device of the quick-locking type, comprising a receptacle including a socket member having a hollow therethrough and having parallel top and bottom end walls, and a threaded stud insertable into said hollow, said hollow being formed with two opposite partially cylindrical smooth walls generated about two axes of which one axis is perpendicular to said top and bottom end walls of said socket member and the other axis slopes downwardly toward and intersects the perpendicular axis, the one said partially cylindrical wall that has the axis perpendicular to the end walls having a radius equal to the radius of the major diameter of said stud threads, and the radius of the partially cylindrical wall generated about the inclined axis having a greater radius than the other, said hollow also having four planar walls that complete the periphery of the hollow from one partially cylindrical wall to the other, the part of said hollow defined by said partially cylindrical wall that has the perpendicular axis thereby comprising a cavity smaller than the part of the hollow that forms a larger cavity defined by the partially cylindrical inclined wall and said planar walls, a first two of said planar walls being in a common plane and projecting outwardly from edges intersecting the partially cylindrical wall of the smaller cavity, and the other two of said planar walls being parallel to each other and perpendicular to said plane and intersecting the outer edges of said first two planar walls and intersecting the side edges of the partially cylindrical wall of the larger cavity, and a single moving part entirely in the larger said cavity and having faces conforming to and slidable against said parallel walls and against said inclined partially cylindrical wall of the larger cavity, and having a longitudinally concave face with partial screw thread convolutions adapted to be engaged by said stud, said moving part having two planar faces in a common plane at the sides of said concave face, said planar faces of said moving part and the corresponding two planar walls of the socket member being in direct opposition and when in engagement permitting approach of the threaded concave face of the smaller cavity of the socket member to a less diameter than the diameter of said stud.

2. A fastening device of the quick-locking type, comprising a receptacle including a socket member having a hollow therethrough and having top and bottom end walls parallel to each other, and a threaded stud insertable into said hollow, said hollow being formed with two opposite partially cylindrical smooth walls generated about two axes of which one axis is perpendicular to said top and bottom end walls of said socket member and the other axis slopes downwardly toward and intersects the perpendicular axis, the one said partially cylindrical wall having the axis perpendicular to the end walls having a radius equal to the radius of the major diameter of said stud threads, and the radius of the partially cylindrical wall generated about the inclined axis having a greater radius than the other, said hollow having other walls including four planar walls, said other walls completing the periphery of the hollow from one partially cylindrical wall to the other, the part of said hollow defined by said partially cylindrical wall that has the perpendicular axis comprising a cavity smaller than the part of the hollow that forms a larger cavity defined by the partially cylindrical inclined wall and said other walls, two of said planar walls being in a common plane and projecting outwardly from edges intersecting the partially cylindrical wall of the smaller cavity, the other two of said planar walls being parallel to each other and perpendicular to said plane, and a single moving part entirely in the larger said cavity and having faces conforming to and slidable against said parallel walls and against said inclined partially cylindrical wall of the larger cavity, and having a longitudinal concave face with partial screw thread convolutions adapted to be engaged by said stud, said moving part having two planar faces in a common plane at the sides of said concave face, said planar faces of said moving part and the corresponding two planar walls of the socket member being in direct opposition and when in engagement permitting approach of the threaded concave face to the smaller cavity of the socket member to a less diameter than the diameter of said stud.

References Cited by the Examiner

UNITED STATES PATENTS

| | | | |
|---|---|---|---|
| 1,500,531 | 7/24 | Schweinert et al. | 85—33 |
| 1,585,627 | 5/26 | O'Brien | 85—33 |
| 2,294,745 | 9/42 | Goetz | 85—33 |
| 2,874,877 | 2/59 | Spencer | 85—33 |
| 2,935,299 | 5/60 | Jansen | 151—19 |

OTHER REFERENCES

Zahodiakin, Pending Application filed June 17, 1959, Serial No. 821,026.

EDWARD C. ALLEN, *Primary Examiner.*

M. HENSON WOOD, Jr., *Examiner.*